US009957746B2

United States Patent
Kaihatsu et al.

(10) Patent No.: US 9,957,746 B2
(45) Date of Patent: May 1, 2018

(54) MOTOR UNIT, MOTOR WITH SPEED REDUCTION MECHANISM, AND SLIDING DOOR AUTOMATIC OPENING/CLOSING DEVICE

(71) Applicant: Mitsuba Corporation, Gunma (JP)

(72) Inventors: Akihiro Kaihatsu, Kiryu (JP); Masazumi Ishikawa, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 0 days. days.

(21) Appl. No.: 15/109,838

(22) PCT Filed: Jan. 26, 2015

(86) PCT No.: PCT/JP2015/052027
§ 371 (c)(1),
(2) Date: Jul. 6, 2016

(87) PCT Pub. No.: WO2015/115368
PCT Pub. Date: Aug. 6, 2015

(65) Prior Publication Data
US 2016/0326790 A1    Nov. 10, 2016

(30) Foreign Application Priority Data

Jan. 28, 2014    (JP) .................................. 2014-013228

(51) Int. Cl.
*H02K 5/22* (2006.01)
*E05F 15/643* (2015.01)
(Continued)

(52) U.S. Cl.
CPC ............ *E05F 15/643* (2015.01); *B60J 5/047* (2013.01); *E05D 15/0621* (2013.01);
(Continued)

(58) Field of Classification Search
CPC ...................................................... H02K 1/148
(Continued)

(56) References Cited

U.S. PATENT DOCUMENTS 6,141,218 A * 10/2000 Miyahara ........... H05K 7/20154
165/104.33
6,665,181 B2 * 12/2003 Tanaka .................... G06F 1/203
165/122

(Continued)

FOREIGN PATENT DOCUMENTS

CN            1115072 A      1/1996
CN         202831977 U       3/2013
(Continued)

OTHER PUBLICATIONS

Japanese Patent Office; Search Report in International Patent Application No. PCT/JP2015/052027 dated Apr. 28, 2015; 2 pages.
(Continued)

*Primary Examiner* — David S Luo
(74) *Attorney, Agent, or Firm* — Wood Herron & Evans LLP

(57) ABSTRACT

Disclosed is a motor unit including: an electric motor; a motor housing (6) configured to accommodate the electric motor; and a control substrate (70) including a sensor element (72S) to detect a position of an inner rotor of the electric motor in a rotational direction. The motor housing (6) includes a substrate accommodating portion (80) configured to accommodate at least a portion of the control substrate (70); a positioning portion (81) that is formed in the substrate accommodating portion (80), and positions the control substrate (70); and a screw configured to fix a stator of the electric motor to the positioning portion (81).

3 Claims, 11 Drawing Sheets

(51) Int. Cl.
- *F16H 1/28* (2006.01)
- *H02K 29/06* (2006.01)
- *H02K 1/14* (2006.01)
- *H02K 7/116* (2006.01)
- *H02K 11/21* (2016.01)
- *H02K 11/33* (2016.01)
- *B60J 5/04* (2006.01)
- *E05D 15/06* (2006.01)
- *E05D 15/10* (2006.01)
- *F16H 57/08* (2006.01)

(52) U.S. Cl.
CPC ............... *E05D 15/10* (2013.01); *F16H 1/28* (2013.01); *H02K 1/148* (2013.01); *H02K 5/225* (2013.01); *H02K 7/116* (2013.01); *H02K 11/21* (2016.01); *H02K 11/33* (2016.01); *H02K 29/06* (2013.01); *E05Y 2201/404* (2013.01); *E05Y 2201/442* (2013.01); *E05Y 2201/654* (2013.01); *E05Y 2201/668* (2013.01); *E05Y 2900/531* (2013.01); *F16H 57/082* (2013.01); *H02K 2211/03* (2013.01)

(58) Field of Classification Search
USPC .............................................. 318/538, 34, 3
See application file for complete search history.

(56) References Cited

U.S. PATENT DOCUMENTS 7,173,392 B2 * 2/2007 Shinojima .............. H02K 7/116
          180/412
2007/0051555 A1   3/2007 Miller et al.

FOREIGN PATENT DOCUMENTS

| JP | 2006340600 A | 12/2006 |
| JP | 2009095136 A | 4/2009 |
| JP | 2010068562 A | 3/2010 |
| JP | 2012253845 A | 12/2012 |

OTHER PUBLICATIONS

Chinese Patent Office, Office Action issued in Chinese Patent Application No. 201580005749.8 dated Nov. 29, 2017, 9 pages.

* cited by examiner

MOTOR UNIT, MOTOR WITH SPEED REDUCTION MECHANISM, AND SLIDING DOOR AUTOMATIC OPENING/CLOSING DEVICE

TECHNICAL FIELD

The present invention relates to a motor unit, a motor with a speed reduction mechanism, and a sliding door automatic opening/closing device for automatically opening and closing a sliding door or a sunroof provided in a vehicle body.

Priority is claimed on Japanese Patent Application No. 2014-013228 filed Jan. 28, 2014, the content of which is incorporated herein by reference.

BACKGROUND ART

In the related art, there is known a drive device for a wagon type vehicle or a one box type vehicle which improves the convenience of a passenger when boarding and disembarking from a vehicle by driving a sliding door, which opens and closes an opening portion provided in a side portion of a vehicle body for boarding and disembarking, via an electric motor.

The sliding door is slidably supported via a roller assembly by a guide rail that extends along a longitudinal direction of the vehicle body. A curved portion is provided in a front portion of the guide rail, which is curved toward a vehicle interior. When the sliding door is driven to a fully closed position, the roller assembly is guided by the curved portion, and the sliding door is drawn toward the inside of the vehicle body such that the sliding door becomes flush with a side surface of the vehicle body.

Meanwhile, the drive device may include a drum around which cables are wound, and an electric motor that rotates the drum in clockwise and counter-clockwise directions. In this type of drive device, the cables wound around the drum are connected to the sliding door via reverse pulleys which are respectively disposed at both front and rear ends of the guide rail. When the electric motor rotates the drum in the clockwise and counter-clockwise directions, either one of a cable routed on the front side of the sliding door or a cable routed on the rear side of the sliding door is wound around the drum, and the other one is unwound from the drum. Accordingly, the sliding door is automatically slid toward an open position or a closed position in such a way that the sliding door is pulled by the cable.

Patent Literature 1 discloses a configuration in which a brushless motor is used as the electric motor of the aforementioned drive device. The electric motor is an inner rotor type motor in which a rotor is provided inside an annular stator. The electric motor is provided with a sensor mechanism that detects the energization time of the electric motor. The sensor mechanism includes a sensor magnet provided on the rotor, and a magnetic field detection element such as a Hall element which is provided on a circuit substrate to detect the magnetic field of the sensor magnet.

This drive device detects the circumferential position of the rotor and controls the energization timing of the electric motor by detecting the magnetic field of the sensor magnet, which is provided on the rotor, via the magnetic field detection element.

CITATION LIST

Patent Literature

[PTL 1] Japanese Patent Application, Publication No. 2009-95136

SUMMARY OF INVENTION

Technical Problem

In the drive device, in order to control the energization time of the electric motor with high accuracy, it is necessary to positionally align the electric motor with the magnetic field detection element, which is provided on the circuit substrate, with high accuracy.

The present invention provides a motor unit, a motor with a speed reduction mechanism and a sliding door automatic opening/closing device in which a sensor to detect a circumferential position of a rotor is positioned with high accuracy relative to an electric motor.

Solution to Problem

According to a first aspect of the present invention, there is provided a motor unit including: an electric motor; a housing configured to accommodate the electric motor; and a control substrate including a sensor that detects a position of a rotor of the electric motor in a rotational direction. The housing includes a substrate accommodating portion configured to accommodate at least a portion of the control substrate; a positioning portion that is formed in the substrate accommodating portion, and positions the control substrate; and a fixing member configured to fix a stator of the electric motor to the positioning portion.

In this configuration, it is possible to position the control substrate with respect to the housing. It is possible to position the electric motor in the rotational direction with respect to the housing by fixing the stator of the electric motor to the positioning portion. As such, it is possible to position the control substrate and the stator using the positioning portion, which is formed in the housing, as a datum point. As a result, it is possible to position the sensor, which is provided on the control substrate, with respect to the electric motor with high accuracy.

According to a second aspect of the present invention, in the motor unit according to the first aspect of the present invention, the control substrate is inserted into and removed from the substrate accommodating portion in a direction along a surface of the control substrate. The positioning portion is formed to extend along an insertion and removal direction of the control substrate. The control substrate includes a slit into which the positioning portion can be inserted along the insertion and removal direction.

In this configuration, it is possible to stably insert into and remove the control substrate from the substrate accommodating portion.

Since the positioning portion is formed into a beam shape which is continuous with the substrate accommodating portion in the insertion and removal direction, the substrate accommodating portion can be reinforced. As a result, it is possible to reduce the occurrence of vibration or sound from the substrate accommodating portion which is caused by vibration of the stator during operation of the electric motor.

According to a third aspect of the present invention, there is provided a motor with a speed reduction mechanism including: the motor unit; and a planetary gear mechanism including an annular outer ring gear fixed to the housing; a sun gear that is disposed at the center of the outer ring gear in a radial direction, and is fixed to a rotational shaft of the electric motor; multiple planetary gears which are disposed between the outer ring gear and the sun gear so as to mesh with the outer ring gear and the sun gear, and are formed to be capable of revolving around the sun gear as a center; and a planetary carrier that is connected to the multiple planetary gears, and is integrally connected to a drum. The positioning portion is provided to overlap at least a portion of the outer ring gear when viewed in a direction along the central axis of the rotational shaft.

In this configuration, a portion of the substrate accommodating portion at which the positioning portion is provided is reinforced. Since the positioning portion is provided to overlap at least a portion of the outer ring gear of the speed reduction mechanism, it is possible to reduce the occurrence of vibration or sound during operation of the speed reduction mechanism.

According to a fourth aspect of the present invention, there is provided a sliding door automatic opening/closing device including: the motor with the speed reduction mechanism; the drum mounted on an output shaft of the motor with the speed reduction mechanism; and an opening cable and a closing cable, one end each of which is connected to either a vehicle body or a sliding door. The motor with a speed reduction mechanism automatically opens and closes the sliding door by operating the opening cable and the closing cable.

In this configuration, it is possible to provide a sliding door automatic opening/closing device capable of positionally aligning an electric motor with a sensor, which detects the circumferential position of a rotor, with high accuracy.

Advantageous Effects of Invention

In the motor unit, the motor with a speed reduction mechanism, and the sliding door automatic opening/closing device, it is possible to position the control substrate with respect to the housing. It is possible to determine the rotational position of the electric motor with respect to the housing by fixing the stator of the electric motor to the positioning portion. As such, it is possible to position the control substrate and the stator using the positioning portion, which is formed in the housing, as a datum point. As a result, it is possible to position the sensor, which is provided on the control substrate, with respect to the electric motor with high accuracy.

DESCRIPTION OF EMBODIMENTS (Vehicle)

Hereinafter, an embodiment of the aspect of the present invention will be described with reference to the accompanying drawings.

Figure 1:
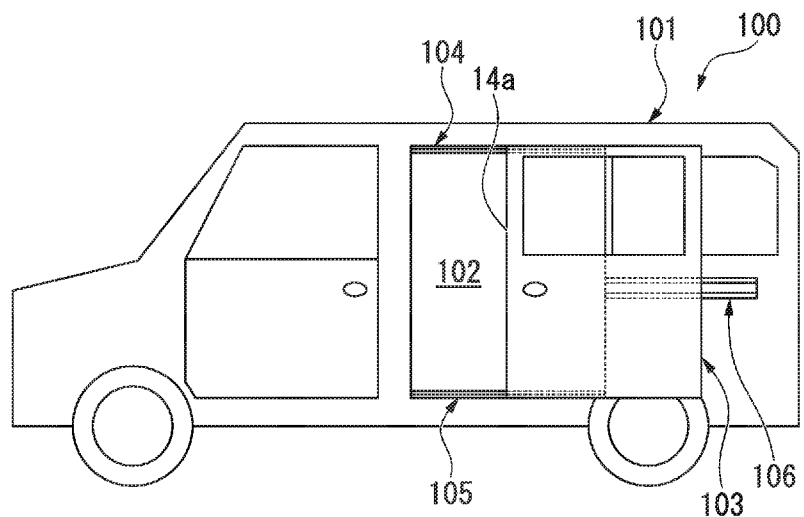
FIG. 1 is a side view of a vehicle equipped with a sliding door automatic opening/closing device in an embodiment of the present invention.
Figure 2:
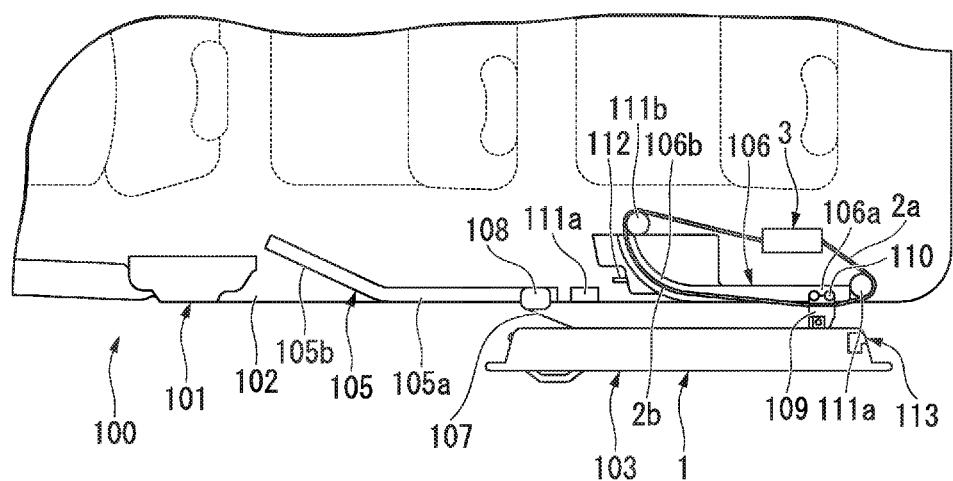
FIG. 2 is a top view illustrating a mounting structure of a sliding door with respect to a vehicle body.

FIG. 1 is a side view of a vehicle equipped with a sliding door automatic opening/closing device in an embodiment of the aspect of the present invention. FIG. 2 is a top view illustrating a mounting structure of a sliding door with respect to a vehicle body. In the following description, for simplification of the description, a ground side of a vehicle is simply referred to as a lower side, a ceiling side of the vehicle is simply referred to as an upper side, a front side of the vehicle in a travelling direction is simply referred to as a front side, and a rear side of the vehicle in the travelling direction is simply referred to as a rear side.

As illustrated in FIG. 1, a sliding door 103 is provided on a side portion of a vehicle body 101 of a vehicle 100, and opens and closes an opening portion 102 of the vehicle body 101. The sliding door 103 is slidably supported by an upper rail 104 disposed on the upper side of the opening portion 102, a lower rail 105 disposed on the lower side of the opening portion 102, and a central rail 106 that is disposed at substantially the vertical center and on the rear side of the opening portion 102.

As illustrated in FIG. 2, the lower rail 105 is a rail in which a straight portion 105a, which extends straight in a longitudinal direction, is formed integrally with an inclined portion 105b which is inclined toward a vehicle interior with respect to the straight portion 105a. The lower rail 105 is fixed to the vehicle body 101 in a state where the inclined portion 105b is disposed toward the front side.

The central rail 106 is a rail in which a straight portion 106a, which extends straight in the longitudinal direction, is formed integrally with a curved portion 106b which is curved toward the vehicle interior with respect to the straight portion 106a. The central rail 106 is fixed to the vehicle body 101 in a state where the curved portion 106b is disposed toward the front side. The upper rail 104 is also formed similar to the lower rail 105, which is not illustrated in FIG. 2.

Meanwhile, a lower arm 107 is provided on a front lower end portion of the sliding door 103. The lower arm 107 supports the sliding door 103. A roller assembly 108 is provided on the tip end side of the lower arm 107. The roller assembly 108 is slidably assembled to the lower rail 105.

A central arm 109 is provided on a rear end portion of the sliding door 103 which is positioned at substantially the vertical center of the sliding door 103. Similar to the lower arm 107, the central arm 109 also supports the sliding door 103. A roller assembly 110 is provided on the tip end side of the central arm 109. The roller assembly 110 is slidably assembled to the central rail 106.

An upper arm (not illustrated) is also provided on a front upper end portion of the sliding door 103, and supports the sliding door 103, which is not illustrated in FIG. 2. A roller assembly (not illustrated) is assembled to a tip end of the upper arm, and is slidably assembled to the upper rail 104.

In this configuration, when the arms 107 and 109 are moved along the corresponding rails 105 and 106, the sliding door 103 is slid along the longitudinal direction of the vehicle body 101. Since the roller assembly 108 is guided by the inclined portion 105b of the lower rail 105, and the roller assembly 110 is guided by the curved portion 106b of the central rail 106, the sliding door 103 is retracted obliquely forward toward the vehicle interior from a position at which the sliding door 103 has been drawn toward the outside of the vehicle body 101. Thereafter, the sliding door 103 is closed and becomes flush with a side surface of the vehicle body 101.

(Sliding Door Automatic Opening/Closing Device)

The vehicle 100 is equipped with a sliding door automatic opening/closing device 1 that automatically opens and closes the sliding door 103. A drive unit 3 of the sliding door automatic opening/closing device 1 is built into the vehicle 100, and is disposed on the rear side of the opening portion 102 of the vehicle 100. The sliding door automatic opening/closing device 1 is a so-called cable type device. An opening cable 2a and a closing cable 2b extend from the drive unit 3 of the sliding door automatic opening/closing device 1, each of which is connected to the sliding door 103.

A front side reverse pulley 111b and a rear side reverse pulley 111a are respectively on the front and rear sides of the central rail 106 on the vehicle body 101.

On the inside of the vehicle 100, the opening cable 2a is routed from the drive unit 3 to the rear side of the vehicle, a routing direction of the opening cable 2a is changed approximately 180° by the rear side reverse pulley 111a, and the opening cable 2a is routed along the central rail 106 and is connected to the central arm 109.

On the inside of the vehicle 100, the closing cable 2b is routed from the drive unit 3 to the front side of the vehicle, the front side reverse pulley 111b changes a routing direction of the closing cable 2b approximately 180° in the vicinity of an end of the central arm 109 which faces the front side of the vehicle, and the closing cable 2b is routed along the central rail 106 and is connected to the central arm 109.

A striker 112 is provided on the rear end side of the opening portion 102 of the vehicle body 101. A latch mechanism 113 is provided at a rear end of the sliding door 103 which is positioned to correspond to the striker 112. The latch mechanism 113 automatically closes the sliding door 103 from a half-closed position to a fully closed position, and maintains a fully closed state of the sliding door 103. The latch mechanism 113 is driven by a latch mechanism drive device (not illustrated).

(Drive Unit)

Figure 3:
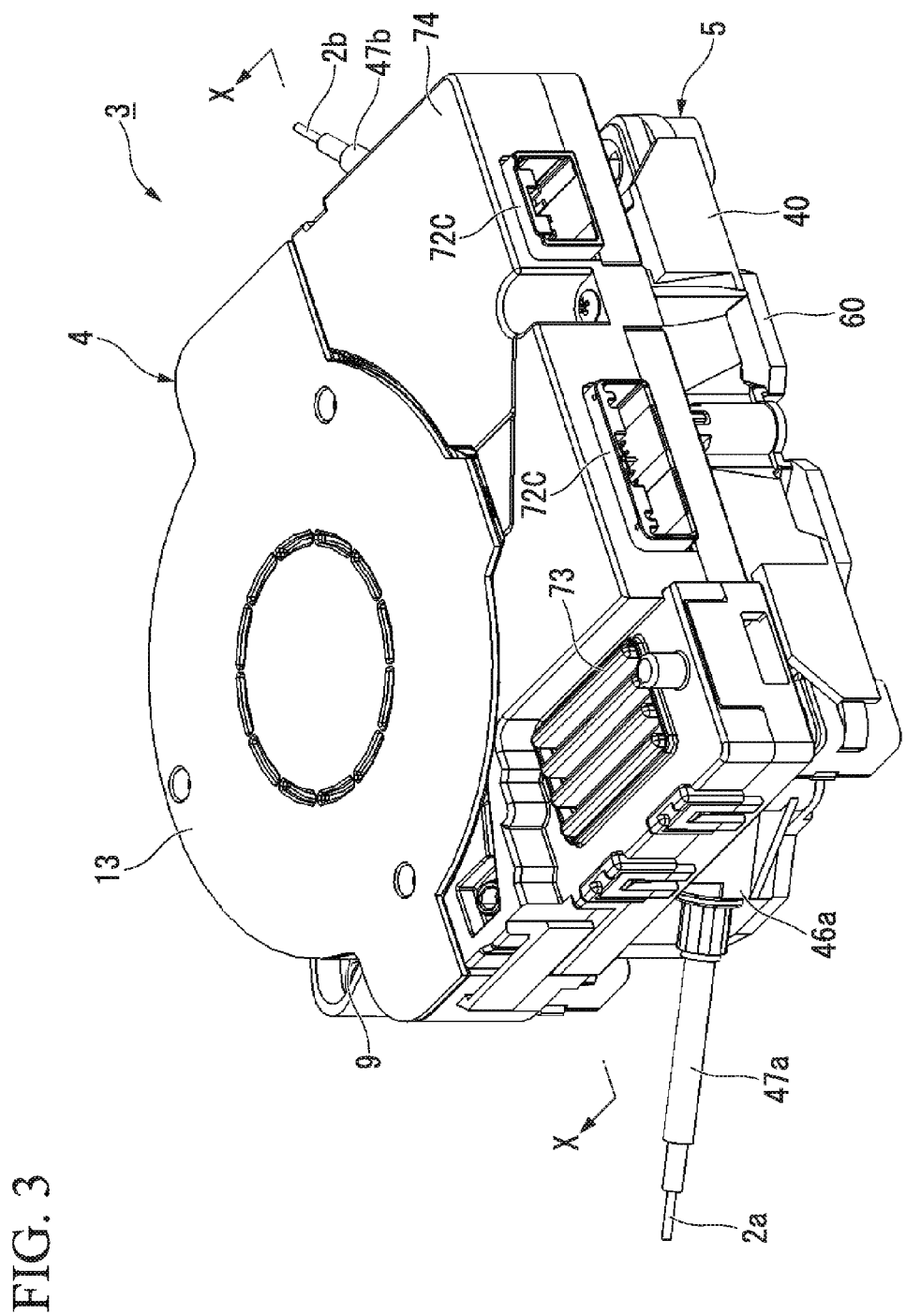
FIG. 3 is a perspective view illustrating the exterior of a drive unit.
Figure 4:
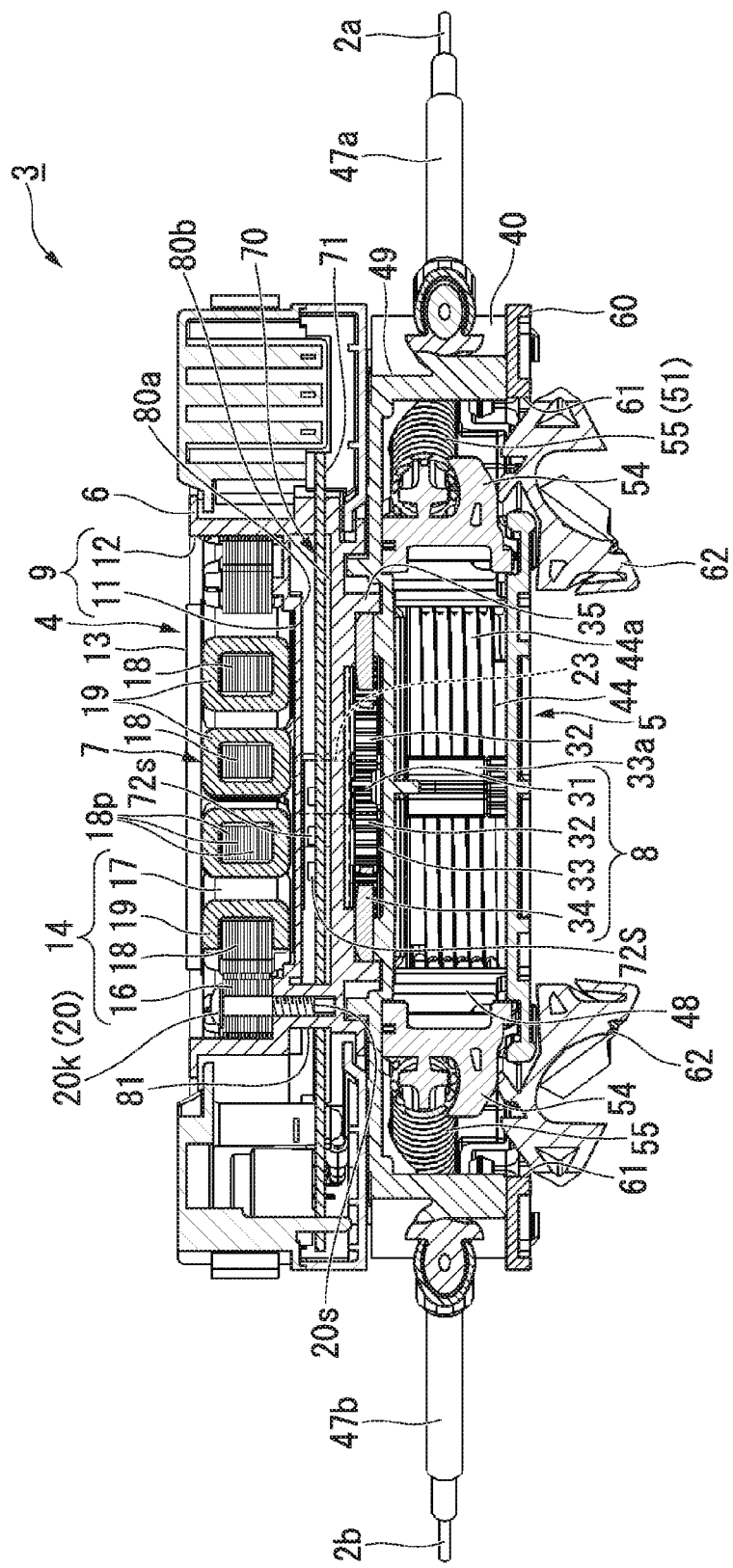
FIG. 4 is a sectional view of the drive unit taken along line X-X in FIG. 3.
Figure 5:
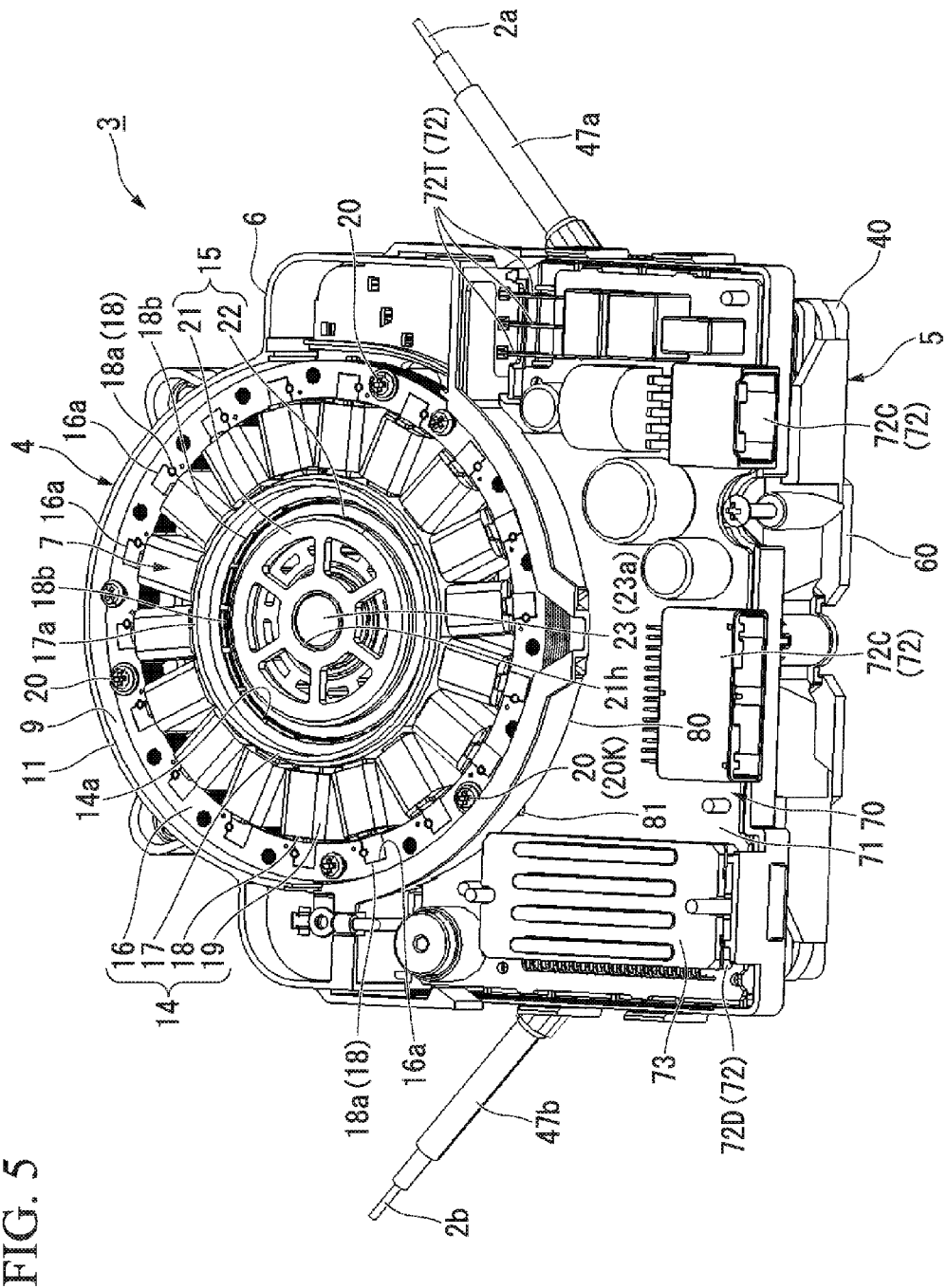
FIG. 5 is a perspective view illustrating the configuration of a motor unit of the drive unit.
Figure 6:
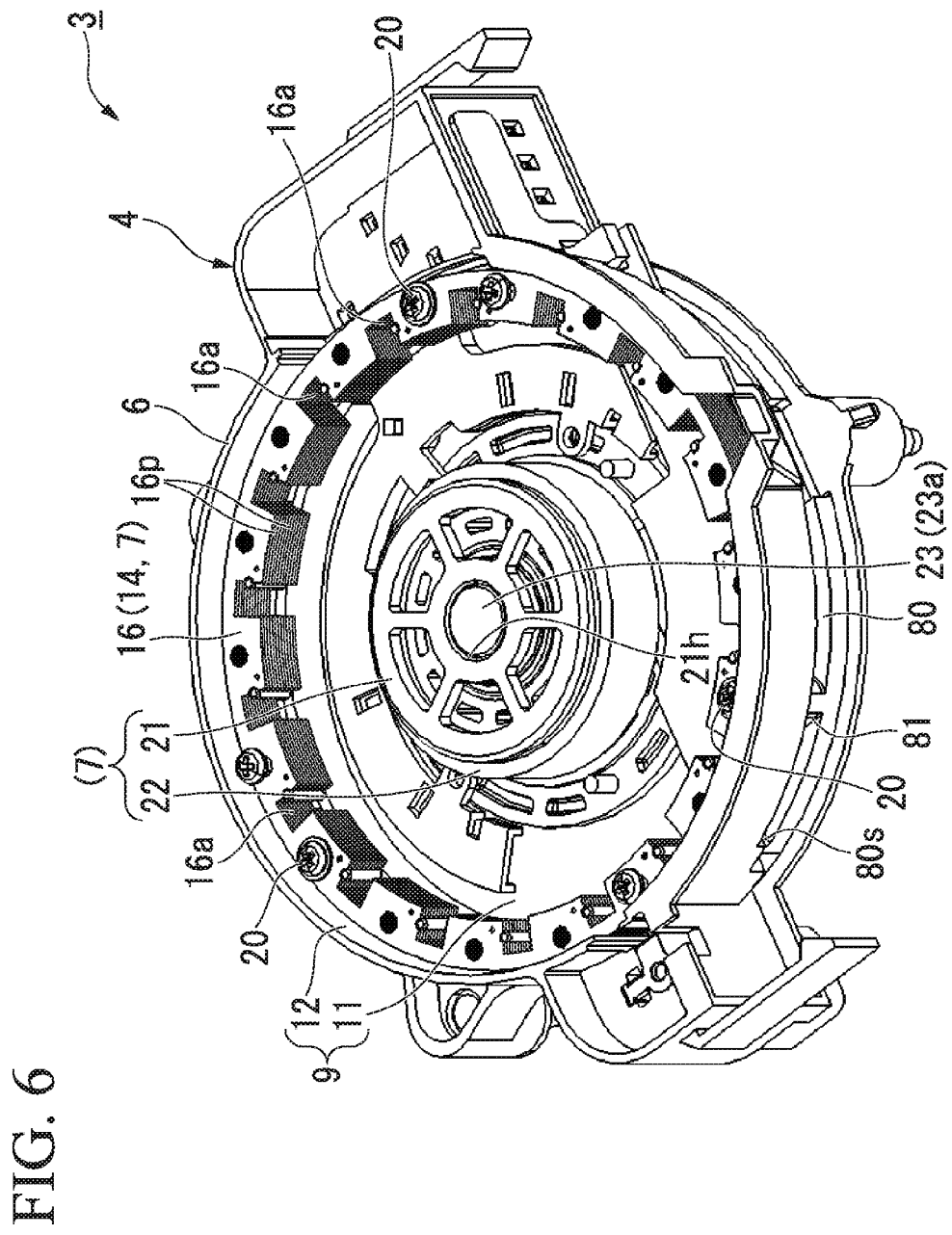
FIG. 6 is a view illustrating the configuration of the motor unit, and is a perspective view in which cores of a stator are omitted.

FIG. 3 is a perspective view illustrating the exterior of the drive unit. FIG. 4 is a sectional view of the drive unit taken along line X-X in FIG. 3. FIG. 5 is a perspective view illustrating the configuration of a motor unit of the drive unit. FIG. 6 is a view illustrating the configuration of the motor unit, and is a perspective view in which cores of a stator are omitted.

As illustrated in FIGS. 3 to 5, the drive unit 3 includes a motor unit 4 disposed on a first surface side of the drive unit 3, and a sliding door drive unit 5 disposed on a second surface side.

(Motor Unit)

As illustrated in FIGS. 4 and 5, the motor unit 4 includes a motor housing (housing) 6; an electric motor 7 as a drive source of the drive unit 3; and a speed reduction mechanism 8 (refer to FIG. 4).

As illustrated in FIGS. 4 to 6, the motor housing 6 is made of resin or the like, and accommodates the electric motor 7. The motor housing 6 includes a bottomed motor accommodating portion 9 that opens toward the outside of the drive unit 3. The motor accommodating portion 9 includes a base plate portion 11 that forms a bottom portion, and a circumferential wall portion 12 having a substantially cylindrical shape which rises on a first surface side of the base plate portion 11. The motor accommodating portion 9 is formed such that a dimension in the radial direction of the motor accommodating portion 9 is smaller than that in the depth direction thereof. Accordingly, the motor housing 6 has a thin shape.

As illustrated in FIGS. 3 and 4, a cover plate 13 is screwed to the motor housing 6 such that a tip end portion of the circumferential wall portion 12 which forms an opening of the motor accommodating portion 9 is sealed.

As illustrated in FIGS. 4 and 5, the electric motor 7 includes a stator 14 disposed on the outer circumferential side of the inside of the motor accommodating portion 9, and an inner rotor (rotor) 15 disposed on the inner circumferential side of the stator 14. The electric motor 7 is a so-called brushless motor.

The stator 14 has an overall annular shape in which an opening portion 14a (refer to FIG. 5) is formed in a central portion. The stator 14 is formed to include an annular stator yoke 16 provided on the outer circumferential side of the stator 14; an insulator 17 provided on the inner circumferential side of the stator yoke 16; multiple core portions 18 provided on the inner circumferential side of the stator yoke 16; and a wiring 19 wound around each of the core portions 18.

As illustrated in FIG. 6, the stator yoke 16 is formed of stacking steel sheets which are formed by stacking multiple thin steel sheets 16p on top of each other in a depth direction of the motor accommodating portion 9. The stator yoke 16 is provided along an inner circumferential surface of the circumferential wall portion 12 of the motor accommodating portion 9. The stator yoke 16 includes multiple core fitting recessions 16a which are formed on the inner circumferential side of the stator yoke 16 while being spaced apart from each other in a circumferential direction. The stator yoke 16 is tightened and fixed to the motor housing 6 with screws 20 at multiple circumferential locations (three locations in the example illustrated in FIG. 6).

As illustrated in FIG. 5, the insulator 17 is made of an insulating material such as resin. The insulator 17 includes an inner circumferential ring portion 17a formed concentrically with the stator yoke 16, and multiple core insulator portions (not illustrated) which extend radially from an outer circumferential portion of the inner circumferential ring portion 17a. The inside of the inner circumferential ring portion 17a of the insulator 17 serves as the opening portion 14a of the stator 14. The number of core insulator portions (not illustrated) provided is the same as that of core portions 18.

As illustrated in FIG. 4, the core portion 18 is formed of stacking steel sheets which are obtained by stacking multiple thin steel sheets 18*p* on top of each other in the depth direction of the motor accommodating portion 9. As illustrated in FIG. 5, a predetermined number of the core portions 18 are provided on the inner circumferential side of the stator yoke 16 along a radial direction while being spaced apart from each other in the circumferential direction. In the present embodiment, 18 core portions 18 are provided. Outer circumferential end portions 18*a* of the core portions 18 are respectively fitted into the core fitting recessions 16*a* of the stator yoke 16. The core portions 18 are provided such that inner circumferential end portions 18*b* of the core portions 18 are exposed to an inner circumferential surface of the inner circumferential ring portion 17*a* of the insulator 17. A portion of each of the core portions 18 other than the outer circumferential end portion 18*a* and the inner circumferential end portion 18*b* is covered with the corresponding core insulator portion (not illustrated) of the insulator 17.

The wiring 19 is wound around each of the core portions 18 with the corresponding core insulator portion (not illustrated) of the insulator 17 interposed therebetween.

As illustrated in FIGS. 5 and 6, the inner rotor 15 is accommodated inside the opening portion 14*a* of the stator 14. The inner rotor 15 is configured to include a rotor body 21, and a ring-like magnet 22 that is integrally provided on an outer circumferential portion of the rotor body 21.

The rotor body 21 includes a shaft hole 21*h* in a central portion. A base end portion 23*a* of a rotational shaft 23 of the electric motor 7 is fitted into the shaft hole 21*h*. The rotational shaft 23 is rotatably supported by a through hole (not illustrated), which is formed in a central portion of the base plate portion 11 of the motor housing 6, via a bearing (not illustrated). As a result, the rotor body 21 is rotatably supported by the motor housing 6 via the rotational shaft 23. The rotational shaft 23 passes through the base plate portion 11 in a thickness direction from a first surface side of the base plate portion 11, on which the motor accommodating portion 9 is provided, and protrudes from a second surface side of the base plate portion 11. The speed reduction mechanism 8 (to be described later) is connected to a protruding tip end.

The magnet 22 is integrally formed on the outer circumferential portion of the rotor body 21. As illustrated in FIG. 5, the magnet 22 is disposed on the inside of the opening portion 14*a* of the stator 14 such that the magnet 22 faces the inner circumferential end portions 18*b* of the multiple core portions 18, which are adjacent to the opening portion 14*a*, while being spaced apart by a predetermined clearance from the inner circumferential end portions 18*b*.

(Speed Reduction Mechanism)

Figure 7:
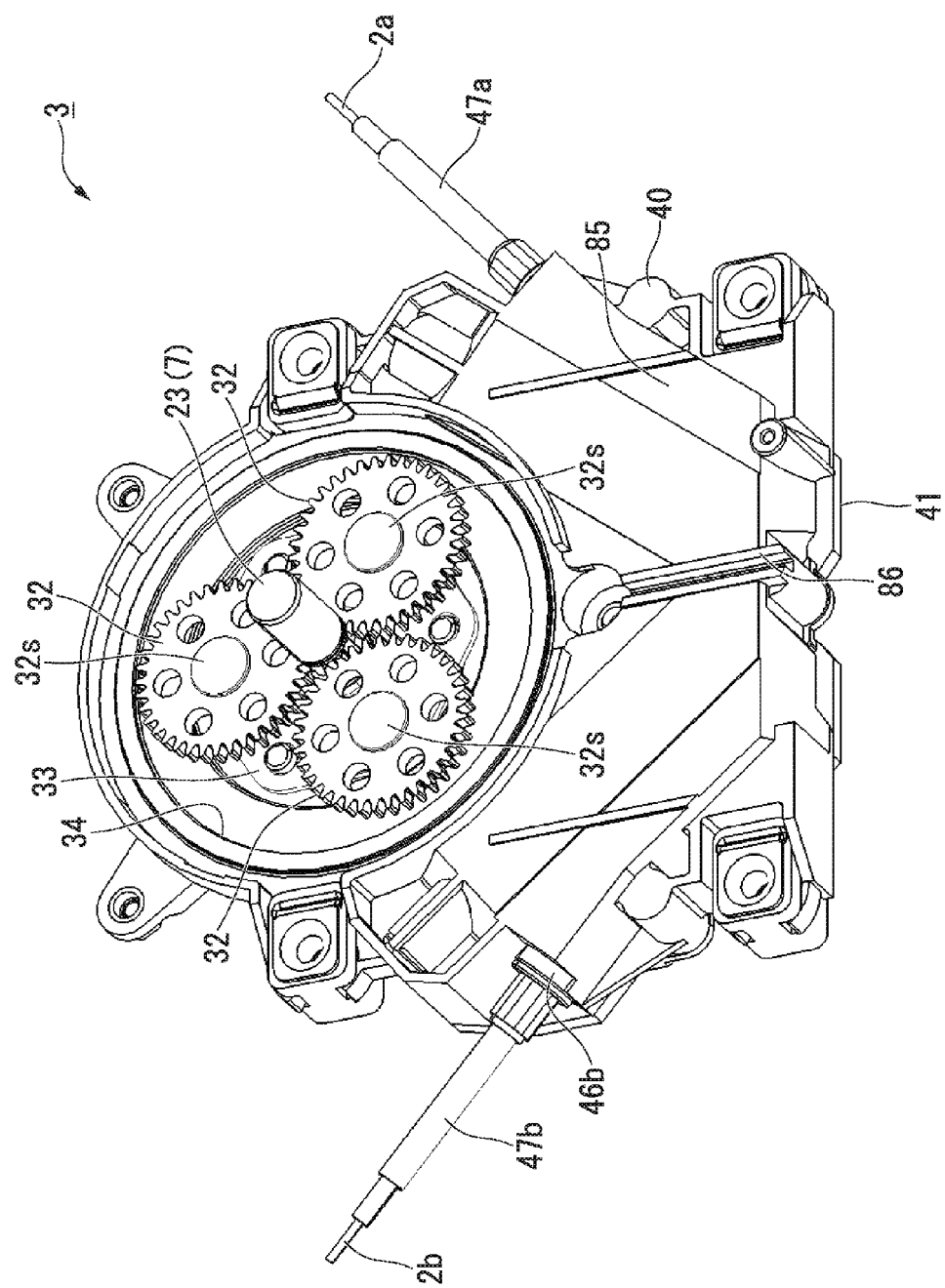
FIG. 7 is a view illustrating the configuration of a speed reduction mechanism, and is a perspective view in which an electric motor and the motor unit are detached.

FIG. 7 is a view illustrating the configuration of the speed reduction mechanism, and is a perspective view in which the electric motor and the motor unit are detached.

As illustrated in FIGS. 4 and 7, the speed reduction mechanism 8 reduces the rotational speed of the rotational shaft 23 of the electric motor 7. The speed reduction mechanism 8 is formed by a so-called planetary gear mechanism. The speed reduction mechanism 8 includes a sun gear 31 (refer to FIG. 4) that is fitted and fixed onto a tip end portion of the rotational shaft 23, and rotates along with the rotational shaft 23; three planetary gears 32 which are meshed with the sun gear 31 and formed to be capable of revolving around the sun gear 31 as a center; a planetary carrier 33 through which the three planetary gears 32 are connected together; and an annular outer ring gear 34 provided on the outer circumferential side of the planetary gears 32.

As illustrated in FIG. 7, a rotational shaft 32*s* is provided at the center of each of the planetary gears 32, and is rotatably supported by the planetary carrier 33. Accordingly, when the three planetary gears 32 revolve around the sun gear 31 as the center, the planetary carrier 33 rotates.

As illustrated in FIG. 4, the outer ring gear 34 is accommodated inside a circumferential wall portion 35 that is formed on the second surface side of the base plate portion 11 so as to surround the speed reduction mechanism 8. The outer ring gear 34 is integrally fixed to the base plate portion 11 of the motor housing 6 with screws or the like (not illustrated).

(Sliding Door Drive Unit)

Figure 8:
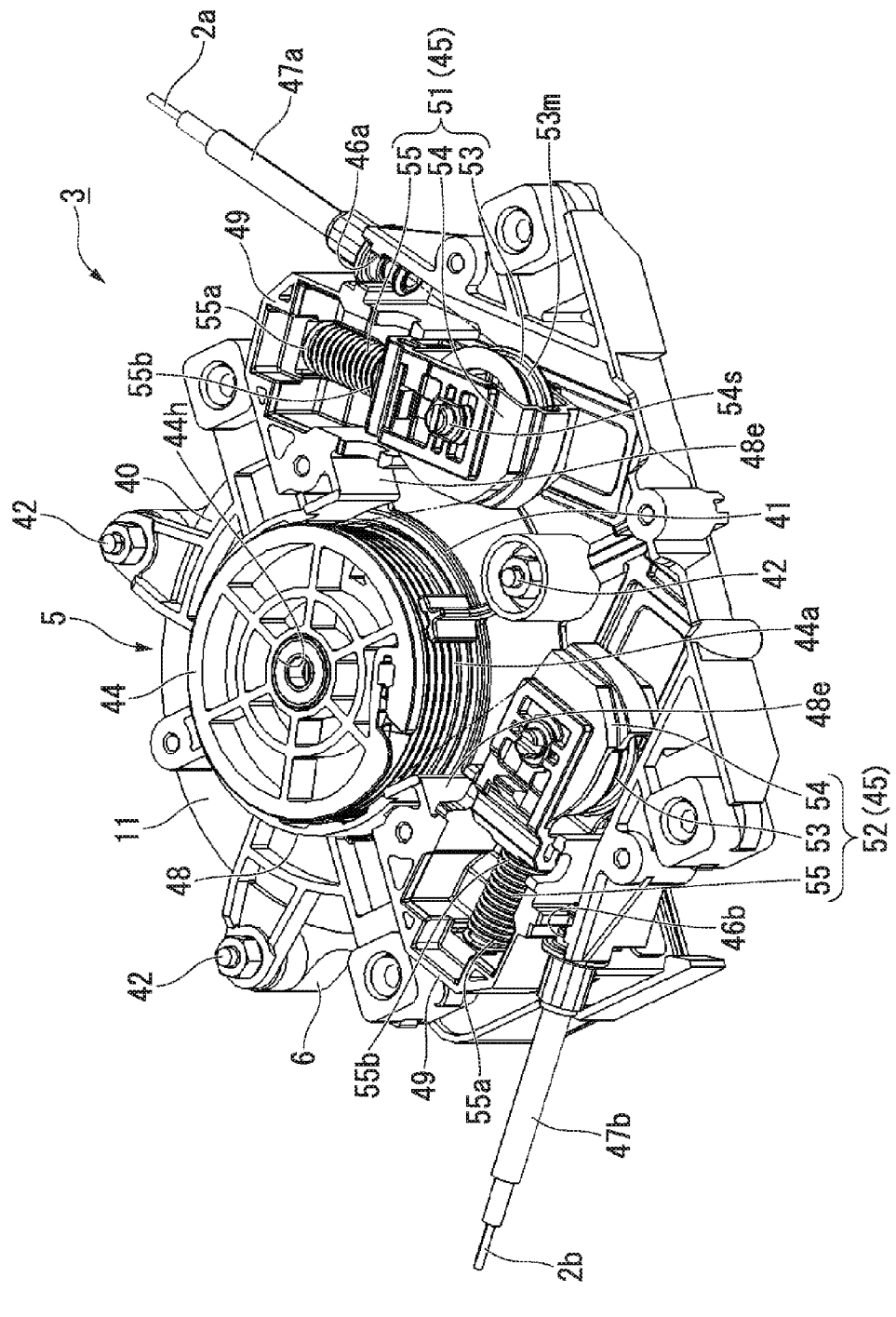
FIG. 8 is a view illustrating the configuration of a sliding door drive unit, and is a perspective view of the drive unit viewed from a second surface side.

FIG. 8 is a view illustrating the configuration of the sliding door drive unit, and is a perspective view of the drive unit viewed from the second surface side.

A drive housing 40 is integrally fixed to the second surface side of the base plate portion 11 of the motor housing 6 with bolt/nuts 42 or the like at multiple locations, and holds components of the sliding door drive unit 5.

An opening portion 41 is formed in the drive housing 40, and has an inner diameter larger than the diameter of the planetary carrier 33 (refer to FIG. 7) of the speed reduction mechanism 8. Accordingly, the planetary carrier 33 is exposed from the drive housing 40 toward the sliding door drive unit 5 via the opening portion 41.

The sliding door drive unit 5 automatically slides the sliding door 103 (refer to FIGS. 1 and 2) based on the driving of the motor unit 4. The sliding door drive unit 5 includes a drum 44 and a tensioner mechanism 45.

The drum 44 is formed into a substantially cylindrical shape. A through hole 44*h* is formed in a central portion of the drum 44. An output shaft 33*a* fixed to a central portion of the planetary carrier 33 (refer to FIG. 4) is inserted into the through hole 44*h* such that the drum 44 and the planetary carrier 33 are connected together non-rotatably relative to each other. As a result, the drum 44 rotates integrally with the planetary carrier 33.

A helical guide groove 44*a* is formed in an outer circumferential surface of the drum 44. A base end side of the opening cable 2*a* and a base end side of the closing cable 2*b* are wrapped multiple times along the guide groove 44*a*. A base end of the opening cable 2*a* and a base end of the closing cable 2*b* are fixed to the drum 44.

The opening cable 2*a* and the closing cable 2*b* are led out toward the outside of the drive housing 40 via the tensioner mechanism 45 (to be described later). For this reason, cable lead-out portions 46*a* and 46*b* are formed to pass through the drive housing 40. Ends of tubular outer tubes 47*a* and 47*b* are respectively inserted into and fixed to the cable lead-out portions 46*a* and 46*b*. The opening cable 2*a* and the closing cable 2*b* are respectively routed through the outer tubes 47*a* and 47*b* from the cable lead-out portions 46*a* and 46*b*.

When the drum 44 rotates in one direction, the opening cable 2*a* is wound around the drum 44, and the closing cable 2*b* is unwound from the drum 44. For this reason, the sliding door 103 is pulled by the opening cable 2*a*, and is slid toward a fully open position (the right direction in FIG. 1, that is, the rear side).

In contrast, when the drum 44 rotates in the other direction, the closing cable 2*b* is wound around the drum 44, and the opening cable 2*a* is unwound from the drum 44. For this reason, the sliding door 103 is pulled by the closing cable 2*b*, and is slid toward the fully closed position (the left direction in FIG. 1, that is, the front side).

An arc-like drum outer circumferential wall 48 is integrally formed in the drive housing 40, and surrounds a circumferential portion of an outer circumferential portion of the drum 44. The opening cable 2a and the closing cable 2b are led out between both end portions 48e and 48e of the drum outer circumferential wall 48 toward the tensioner mechanism 45.

(Tensioner Mechanism)

The tensioner mechanism 45 applies a predetermined tension to each of the cables 2a and 2b. The tensioner mechanism 45 includes an opening side tensioner unit 51 disposed on an opening cable 2a side, and a closing side tensioner unit 52 disposed on an opening cable 2b side.

Each of the tensioner units 51 and 52 includes a tension roller 53; a roller case 54 that rotatably supports the tension roller 53; and a coil spring 55 that elastically supports the roller case 54.

Each of the tension rollers 53 is like a disc. Grooves 53m are respectively formed on outer circumferential surfaces of the tension rollers 53, and the cables 2a and 2b are respectively wound around the grooves 53m.

The roller case 54 includes a support shaft 54s that rotatably supports the tension roller 53.

A first end 55a of the coil spring 55 is fixed to a tensioner holding portion 49 provided in the drive housing 40, and a second end 55b of the coil spring 55 is fixed to the roller case 54. The coil spring 55 is configured in such a way as to be elastically deformable in a compression direction. In a case where tension higher than or equal to a predetermined value is applied to each of the cables 2a and 2b, the coil spring 55 is compressibly deformed.

The tensioner unit 51 is disposed between the cable lead-out portion 46a and a position at which the cable 2a is led out from the drum 44, and the tensioner unit 52 is disposed between the cable lead-out portion 46b and a position at which the cable 2b is led out from the drum 44. The cables 2a and 2b, which are led out from the outer circumferential portion of the drum 44, are respectively looped backward by the tension rollers 53, and are respectively routed outward through the cable lead-out portions 46a and 46b. The tension rollers 53, around which the cables 2a and 2b are wound, are respectively biased by the coil springs 55, and thus, tension is applied to the cable 2a between the cable lead-out portion 46a and the position at which the cable 2a is led out, and tension is applied to the cable 2b between the cable lead-out portion 46b and the position at which the cable 2b is led out.

As illustrated in FIG. 4, a drive cover 60 is fixed to the drive housing 40 with screws or the like (not illustrated), and covers the drum outer circumferential wall 48, the tensioner holding portion 49, and the like.

Opening portions 61 and 61 are formed in portions of the drive cover 60 which respectively face the tensioner units 51 and 52. Each of the opening portions 61 is formed along a direction in which the roller case 54 is moved by expansion and contraction of the coil spring 55.

Two stoppers 62 are provided on the outer circumferential side of the drive cover 60. The stoppers 62 are respectively connected to the roller cases 54 through the opening portions 61 with pins or the like (not illustrated).

In a state where the drive unit 3 is mounted in the vehicle 100, the stoppers 62 limits movement of the roller cases 54 of the tensioner units 51 and 52, and prevents excessive expansion of the coil springs 55. As a result, in a state where the drive unit 3 is mounted in the vehicle 100, the predetermined tension of each of the cables 2a and 2b is maintained.

(Control Substrate)

Figure 9:
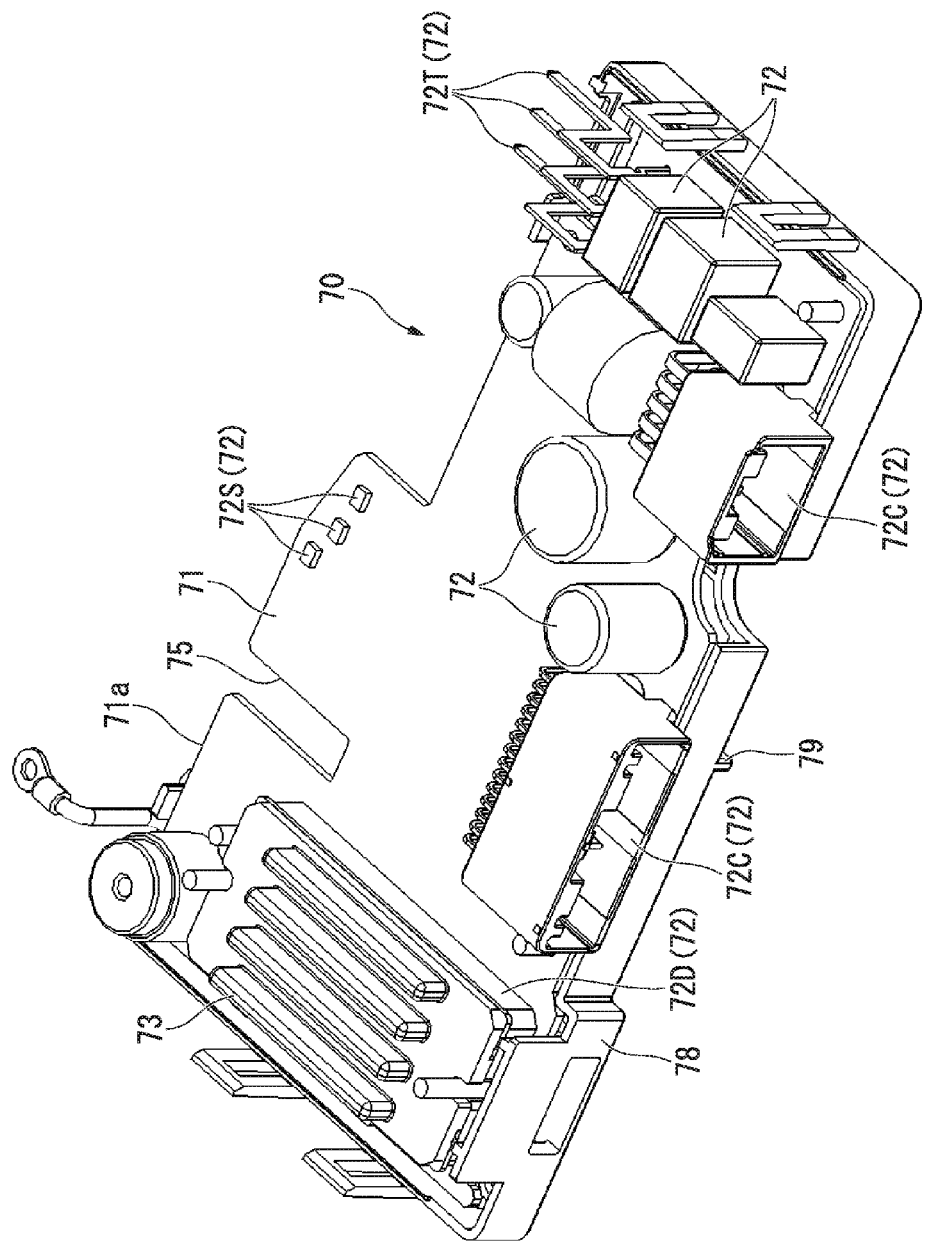
FIG. 9 is a perspective view illustrating the configuration of a control substrate.
Figure 10:
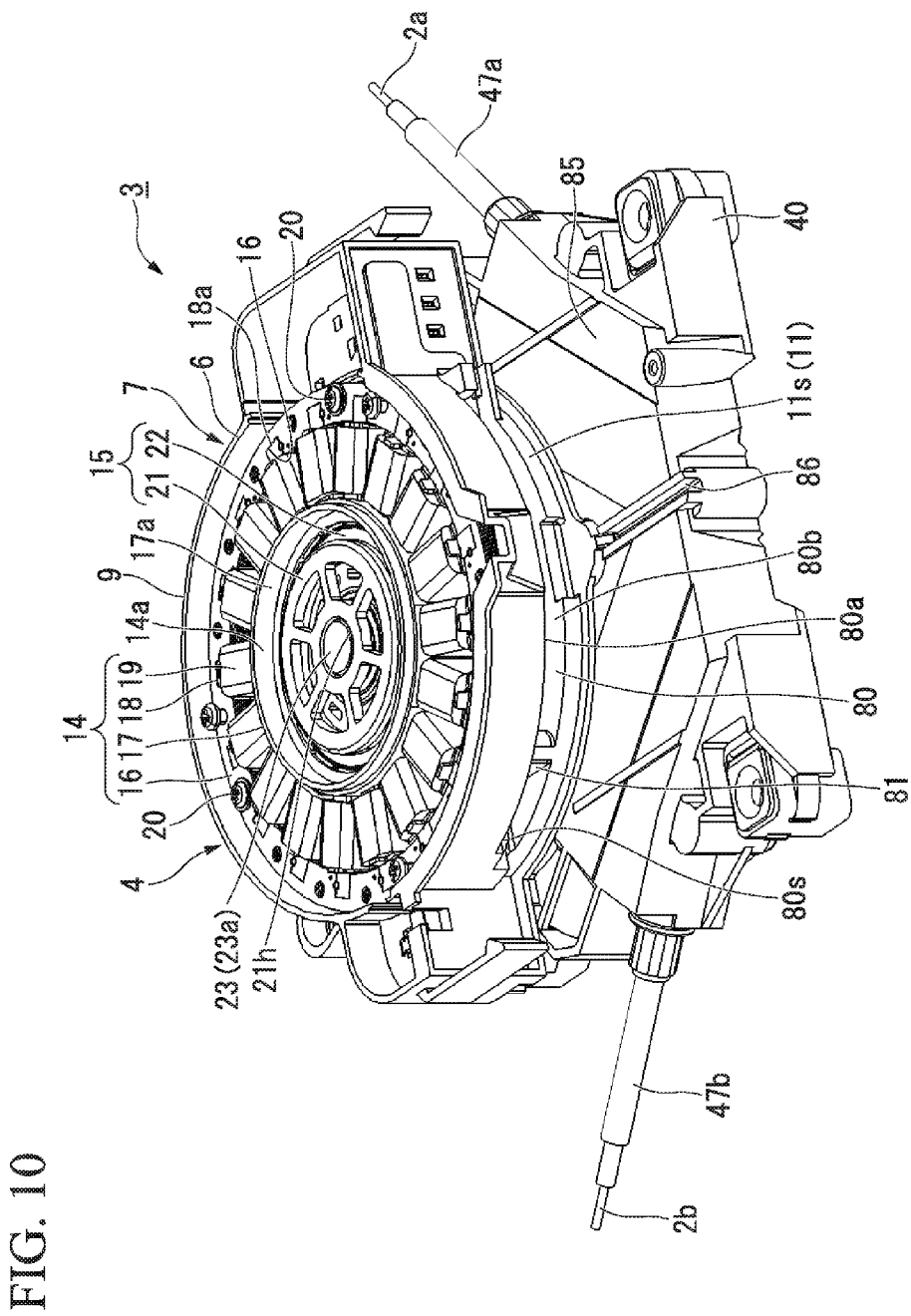
FIG. 10 is a perspective view of a motor housing on which the control substrate is mounted.
Figure 11:
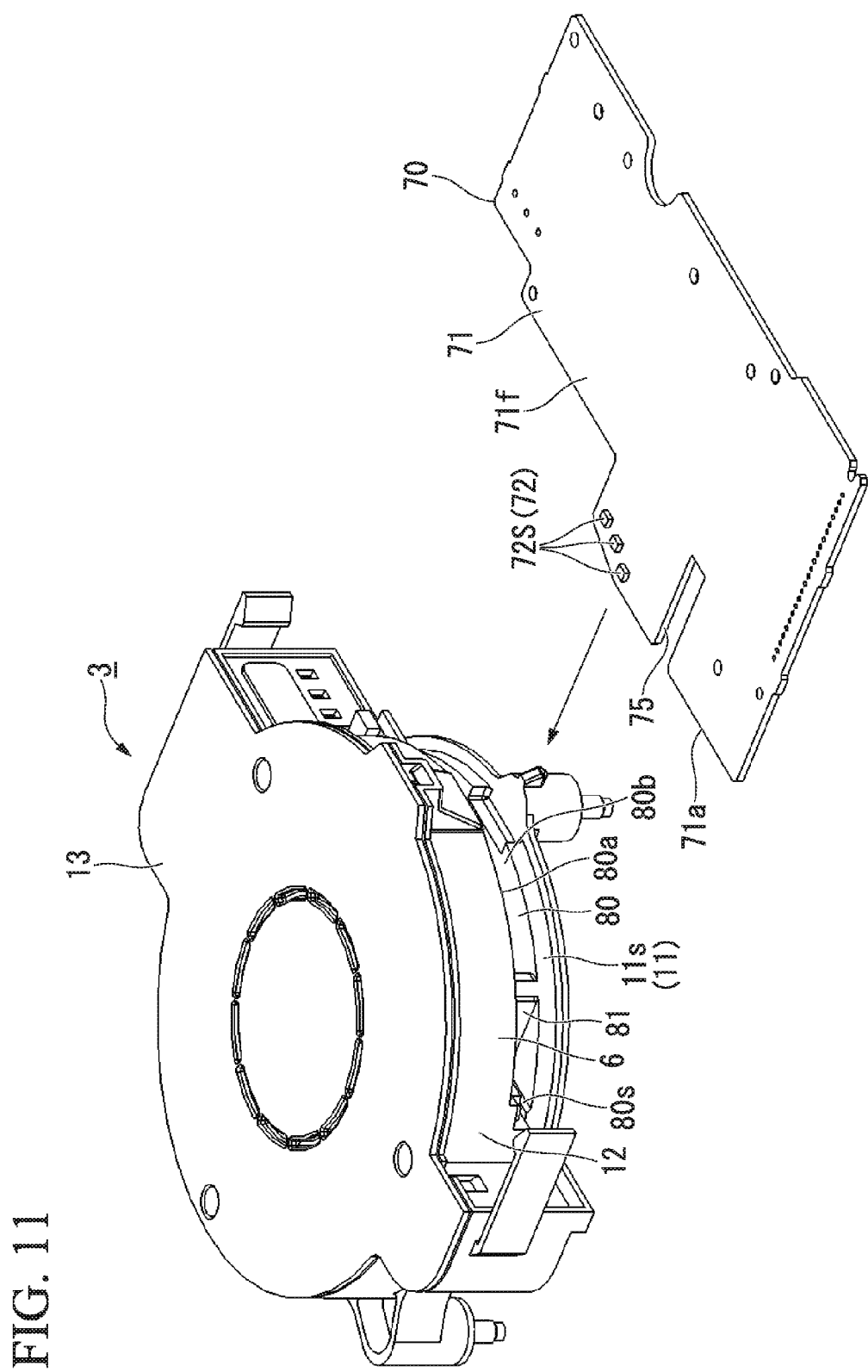
FIG. 11 is a perspective view illustrating an insertion and removal direction of the control substrate with respect to a substrate accommodating portion of the motor housing.
Figure 12:
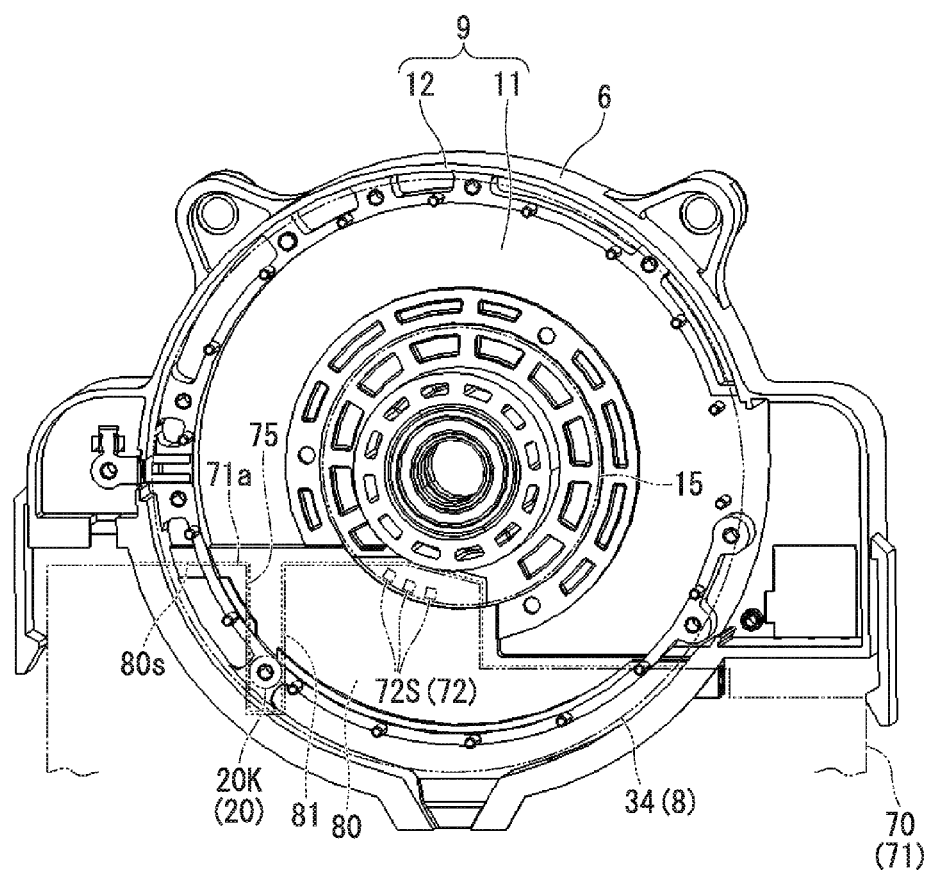
FIG. 12 is a top view illustrating the substrate accommodating portion of the motor housing.

FIG. 9 is a perspective view illustrating the configuration of a control substrate. FIG. 10 is a perspective view of the motor housing on which the control substrate is mounted. FIG. 11 is a perspective view illustrating an insertion and removal direction of the control substrate with respect to a substrate accommodating portion of the motor housing. FIG. 12 is a top view illustrating the substrate accommodating portion of the motor housing.

As illustrated in FIG. 5, the drive unit 3 includes a control substrate 70 that controls the operation of the electric motor 7. The control substrate 70 drives the electric motor 7, and detects the position of the inner rotor 15 of the electric motor 7 in the rotational direction.

As illustrated in FIG. 9, the control substrate 70 includes a substrate body 71, and various electric elements 72 mounted on the substrate body 71. The electric elements 72 mounted on the substrate body 71 are connectors 72C, a driver element 72D, a connection terminal 72T, sensor elements (sensors) 72S, and the like.

The connectors 72C are connected to an external power source and an external control device via a harness (not illustrated).

As illustrated in FIG. 5, the driver element 72D controls supply of current that is supplied from the external power source to the wiring 19 of the stator 14 via the connector 72C. On the driver element 72D, a heat sink 73 is provided.

The wiring 19 is electrically connected to the control substrate 70 via the connection terminal 72T. Current supplied from the external power source via the connector 72C is supplied to the wiring 19 via the connection terminal 72T according to control of the driver element 72D.

As illustrated in FIG. 9, the sensor elements 72S detect the position of the inner rotor 15 in the rotational direction. For example, Hall elements are preferably used as the sensor elements 72S.

As illustrated in FIG. 5, the control substrate 70 is held by the motor housing 6 on the outer circumferential side of the motor accommodating portion 9.

As illustrated in FIG. 10, a substrate accommodating portion 80 is formed in the motor housing 6, and accommodates a portion of the control substrate 70. As illustrated in FIG. 4, the substrate accommodating portion 80 is formed in an intermediate portion of the base plate portion 11 in the thickness direction.

As illustrated in FIG. 10, the substrate accommodating portion 80 opens to an outer circumferential surface 11s of the base plate portion 11 and is continuously formed in a recession-like shape in a direction along the base plate portion 11.

As illustrated in FIG. 11, the control substrate 70 can be inserted into and removed from the substrate accommodating portion 80 in a direction (direction of the arrow in FIG. 11) along a surface 71f of the substrate body 71. As illustrated in FIGS. 11 and 12, a stopper surface 80s is formed in the substrate accommodating portion 80 such that when the substrate body 71 is inserted into the substrate accommodating portion 80, the stopper surface 80s comes into contact with a tip end surface (end surface to face the substrate accommodating portion 80) 71a of an outer circumferential edge of the substrate body 71 and limits the insertion depth of the control substrate 70.

As illustrated in FIGS. 4, 10, and 11, a positioning portion 81 is formed in the substrate accommodating portion 80, and positions the substrate body 71 with respect to the motor housing 6. The positioning portion 81 is formed to extend (so as to continue) along the insertion and removal direction of the control substrate 70. The positioning portion 81 is formed such that an inner circumferential surface 80a on a side of the electric motor 7 and an inner circumferential surface 80b on a side of the speed reduction mechanism 8 are connected in the substrate accommodating portion 80.

As illustrated in FIG. 11, a slit 75 is formed in the substrate body 71 such that the slit 75 extends toward the inside of the substrate body 71 from the tip end surface 71a configured to be inserted into the substrate accommodating portion 80. And into the slit 75, the positioning portion 81 can be inserted. In order to insert the control substrate 70 into the substrate accommodating portion 80, the positioning portion 81 is inserted into the slit 75 in a state where the tip end surface 71a is positioned to face an opening of the substrate accommodating portion 80. The insertion of the control substrate 70 into the substrate accommodating portion 80 is guided by inserting the positioning portion 81 into the slit 75. As a result, the positioning portion 81 serves as a guide member that guides the insertion and removal operation of the control substrate 70.

As illustrated in FIG. 5, in a state where the positioning portion 81 is inserted into the slit 75, a portion of the substrate body 71 of the control substrate 70 is accommodated inside the substrate accommodating portion 80. Accordingly, the control substrate 70 is positioned and fixed with respect to the motor housing 6 via the positioning portion 81.

As illustrated in FIG. 12, in a state where the control substrate 70 is inserted into the substrate accommodating portion 80, the sensor elements 72S, which are Hall elements, face the inner rotor 15 with the base plate portion 11 interposed between the sensor element 72S and the inner rotor 15. Accordingly, each of the sensor elements 72S detects magnetic field intensity of the inner rotor 15, and detects the position of the inner rotor 15 in the rotational direction.

As illustrated in FIG. 4, a screw (fixing member) 20K among multiple screws 20, with which the stator yoke 16 of the stator 14 of the electric motor 7 is fixed to the motor housing 6, is disposed at a position on the base plate portion 11 which corresponds the position of to the positioning portion 81. The screw 20K is screwed such that a tip end portion 20s of the screw 20K reaches the positioning portion 81. The stator 14 of the electric motor 7 is fixed to the positioning portion 81 with this screw 20. As a result, it is possible to ensure a sufficient screwing depth of the screw 20K with respect to the base plate portion 11.

As illustrated in FIG. 12, the positioning portion 81 is preferably provided to overlap at least a portion of the outer ring gear 34 of the speed reduction mechanism 8 when viewed in a direction along an axis of the rotational shaft 23.

A portion of the base plate portion 11, in which the substrate accommodating portion 80 is formed, has a thickness smaller than that of other portions of the base plate portion 11. In a case where the stator 14 is energized, the outer ring gear 34 may generates periodic sound due to the revolutional operations of the planetary gears 32. In contrast, since the positioning portion 81 reinforces the portion of the base plate portion 11 in which the substrate accommodating portion 80 is formed, it is possible to reduce the occurrence of sound or vibration from the base plate portion 11 caused by resonance of the outer ring gear 34.

As illustrated in FIG. 9, in the substrate body 71, a support plate 78 to support the substrate body 71 is integrally provided on a surface (back surface) opposite to the surface 71f on which the electric elements 72 are mounted. The support plate 78 includes a protrusion strip 79 on an opposite side to the side faces the substrate body 71, being formed continuously along the insertion and removal direction of the substrate body 71 with respect to the substrate accommodating portion 80.

Meanwhile, as illustrated in FIG. 10, a substrate support surface 85 is formed on a portion of the drive housing 40 which extends toward the outer circumferential side of the base plate portion 11. A guide groove 86 is formed in the substrate support surface 85, and extends parallel with the positioning portion 81.

In order to insert the control substrate 70 into the substrate accommodating portion 80, the protrusion strip 79 of the support plate 78 is placed into the guide groove 86. Accordingly, it is possible to smoothly perform the insertion and removal operation of the control substrate 70.

As illustrated in FIG. 3, a substrate cover 74 covers the control substrate 70, which is inserted into the substrate accommodating portion 80, except for connection portions of the connectors 72C and the heat sink 73.

(Operation of Sliding Door Automatic Opening/Closing Device)

Hereinafter, the operation of the sliding door automatic opening/closing device 1 will be described.

In a case where an operator performs an open operation on an operation switch (not illustrated) provided in the vehicle interior, a predetermined operation signal is input to the control substrate 70. Hereupon, according to control of the control substrate 70, the stator 14 of the electric motor 7 is energized, and the inner rotor 15 is driven to rotate. The rotation of the inner rotor 15 is transmitted to the planetary carrier 33 via the sun gear 31 and the planetary gears 32 of the speed reduction mechanism 8. Accordingly, the drum 44 rotates integrally with the planetary carrier 33 in one direction. Hereupon, the closing cable 2b is wound around the drum 44, and the opening cable 2a is unwound from the drum 44.

Since the closing cable 2b is wound around the drum 44, the closing cable 2b becomes tight, and the opening cable 2a becomes loose. Accordingly, the sliding door 103 is slid toward a closed position.

At this time, the tension rollers 53 (around which the cables 2a and 2b are respectively wound) of the tensioner units 51 and 52 of the tensioner mechanism 45 are respectively biased by the coil springs 55. As a result, tension is applied to each of the cables 2a and 2b such that the loosing of each of the cables 2a and 2b is prevented.

As illustrated in FIG. 2, as the sliding door 103 is moved to the closed position, the roller assembly 108 provided in the sliding door 103 is drawn toward the inclined portion 105b from the straight portion 105a of the lower rail 105. In addition, the roller assembly 110 of the sliding door 103 is drawn toward the curved portion 106b from the straight portion 106a of the central rail 106. In this case, since the roller assemblies 108 and 110 are respectively drawn toward the inclined portion 105b and the curved portion 106b, the routing path length of each of the cables 2a and 2b is increased.

Hereupon, tension applied to the opening cable 2a is increased, the coil spring 55 of the opening side tensioner unit 51 is compressed, and the tension roller 53 is displaced toward the coil spring 55. Accordingly, the opening cable 2a is pressed out toward the outside (lower side in FIG. 8) of the drive housing 40, and thus, the extension of the routing path length is absorbed.

Subsequently, when the sliding door 103 is further slid in a closing direction, and enters a half-closed state, the movement of the sliding door 103 is stopped. In this state, the drum 44 and the planetary carrier 33 are also stopped for the moment.

When the electric motor 7 is continuously driven in this state, the planetary gears 32 revolve around the sun gear 31 as the center, and the planetary carrier 33 and the drum 44 rotate integrally with the planetary gears 32. Hereupon, the closing cable 2b is wound around the drum 44, and thus, the closing cable 2b becomes tight and the opening cable 2a becomes loose.

Accordingly, the roller cases 54 of the opening side tensioner unit 51 and the closing side tensioner unit 52 of the tensioner mechanism 45 are moved along the expansion and contraction direction of the coil spring 55. Hereupon, the latch mechanism 113 (refer to FIG. 2) is driven by a latch drive device (not illustrated). Due to the driving of the latch mechanism 113, the latch mechanism 113 is engaged into the striker 112 provided in the vehicle body 101, and the sliding door 103 is closed to the fully closed position. Accordingly, the closing operation of the sliding door 103 performed by the sliding door automatic opening/closing device 1 is complete.

Since the opening operation of the sliding door 103 is performed in a reverse sequence of the closing operation, and is basically the same as the closing operations, description of the opening operation is omitted.

Effects

In the embodiment described above, the drive unit 3 includes the control substrate 70 including the sensor elements 72S which detect the position of the inner rotor 15 of the electric motor 7 in the rotational direction. The motor housing 6 includes the substrate accommodating portion 80 that accommodates a portion of the control substrate 70; the positioning portion 81 that is formed in the substrate accommodating portion 80 and positions the control substrate 70; and a fixing member 82 that fixes the stator 14 of the electric motor 7 to the positioning portion 81.

Accordingly, it is possible to position the control substrate 70 and the stator 14 using the positioning portion 81 as a datum point. It is possible to position the sensor elements 72S, which are provided on the control substrate 70, with respect to the electric motor 7 with high accuracy. As a result, it is possible to detect the position of the inner rotor 15 in the rotational direction with high accuracy via the sensor elements 72S, and to control switching of the operation of the electric motor 7.

The control substrate 70 is inserted into and removed from the substrate accommodating portion 80 in the direction along the surface 71f of the control substrate 70. The positioning portion 81 is formed to extend along the insertion and removal direction of the control substrate 70. The control substrate 70 includes the slit 75 into which a guide member 83 can be inserted.

Accordingly, it is possible to stably insert into and remove the control substrate 70 from the substrate accommodating portion 80 by inserting the positioning portion 81 into the slit 75.

The positioning portion 81 is formed such that the inner circumferential surface 80a on the side of the electric motor 7 is connected to the inner circumferential surface 80b on the side of the speed reduction mechanism 8 of the substrate accommodating portion 80. Accordingly, it is possible to reinforce the substrate accommodating portion 80. As a result, it is possible to reduce the occurrence of vibration or sound in the vicinity of the substrate accommodating portion 80 of the motor housing 6, which is caused by vibration of the stator 14 during operation of the electric motor 7.

The positioning portion 81 is provided to overlap at least a portion of the outer ring gear 34 when viewed in the direction along the central axis of the rotational shaft 23.

In this configuration, a portion of the substrate accommodating portion 80 at which the positioning portion 81 is provided is reinforced. Since the positioning portion 81 is provided to overlap at least a portion of the outer ring gear 34 of the speed reduction mechanism 8, it is possible to reduce the occurrence of vibration or sound during operation of the speed reduction mechanism 8.

The present invention is not limited to the aforementioned embodiment, and modifications can be made to the aforementioned embodiment in various forms insofar as the various modifications do not depart from the concept of the present invention.

In the aforementioned embodiment, the drive unit 3 of the sliding door automatic opening/closing device 1 is built into the sliding door 103, and end portions of the opening cable 2a and the closing cable 2b, which extend from the drive unit 3, are connected to the vehicle body 101. However, the present invention is not limited to that configuration, and the drive unit 3 may be mounted on the vehicle body 101, and the end portions of the opening cable 2a and the closing cable 2b, which extend from the drive unit 3, may be connected to the sliding door 103.

In order to fix the stator yoke 16 to the motor housing 6, the screw 20 is disposed at the position on the base plate portion 11 which corresponds to the position of the positioning portion 81; however, the present invention is not limited to that configuration. Instead of the screws 20, rivets or positioning pins may be used.

REFERENCE SIGNS LIST

1: SLIDING DOOR AUTOMATIC OPENING/CLOSING DEVICE
2a: OPENING CABLE
2b: CLOSING CABLE
3: DRIVE UNIT
4: MOTOR UNIT
5: SLIDING DOOR DRIVE UNIT
6: MOTOR HOUSING (HOUSING)
7: ELECTRIC MOTOR
8: SPEED REDUCTION MECHANISM
9: MOTOR ACCOMMODATING PORTION
11: BASE PLATE PORTION
14: STATOR
15: INNER ROTOR (ROTOR)
16: STATOR YOKE
18: CORE PORTION
19: WIRING
20: SCREW
20K: SCREW (FIXING MEMBER)
31: SUN GEAR
32: PLANETARY GEAR
33: PLANETARY CARRIER
34: OUTER RING GEAR
40: DRIVE HOUSING
44: DRUM
45: TENSIONER MECHANISM
51: OPENING SIDE TENSIONER UNIT
52: CLOSING SIDE TENSIONER UNIT
53: TENSION ROLLER
55: COIL SPRING
70: CONTROL SUBSTRATE

71: SUBSTRATE BODY
72: ELECTRIC ELEMENT
72C: CONNECTOR
72D: DRIVER ELEMENT
72S: SENSOR ELEMENT (SENSOR)
72T: CONNECTION TERMINAL
80: SUBSTRATE ACCOMMODATING PORTION
81: POSITIONING PORTION
100: VEHICLE
101: VEHICLE BODY
102: OPENING PORTION
103: SLIDING DOOR

The invention claimed is:

1. A motor unit comprising:
an electric motor;
a housing configured to accommodate the electric motor; and
a control substrate including a sensor that detects a position of a rotor of the electric motor in a rotational direction,
wherein the housing includes a substrate accommodating portion configured to accommodate at least a portion of the control substrate; a positioning portion that is formed in the substrate accommodating portion, and positions the control substrate; and a fixing member configured to fix a stator of the electric motor to the positioning portion,
wherein the control substrate is inserted into and removed from the substrate accommodating portion in a direction along a surface of the control substrate,
wherein the positioning portion is formed to extend along an insertion and removal direction of the control substrate, and
wherein the control substrate includes a slit into which the positioning portion can be inserted along the insertion and removal direction.

2. A motor with a speed reduction mechanism comprising:
a motor unit comprising;
an electric motor;
a housing configured to accommodate the electric motor; and
a control substrate including a sensor that detects a position of a rotor of the electric motor in a rotational direction,
wherein the housing includes a substrate accommodating portion configured to accommodate at least a portion of the control substrate; a positioning portion that is formed in the substrate accommodating portion, and positions the control substrate; and a fixing member configured to fix a stator of the electric motor to the positioning portion; and
a planetary gear mechanism including an annular outer ring gear fixed to the housing; a sun gear that is disposed at the center of the outer ring gear in a radial direction, and is fixed to a rotational shaft of the electric motor; multiple planetary gears which are disposed between the outer ring gear and the sun gear so as to mesh with the outer ring gear and the sun gear, and are formed to be capable of revolving around the sun gear as a center; and a planetary carrier that is connected to the multiple planetary gears, and is integrally connected to a drum,
wherein the positioning portion is provided to overlap at least a portion of the outer ring gear when viewed in a direction along the central axis of the rotational shaft.

3. A sliding door automatic opening/closing device comprising:
the motor with a speed reduction mechanism according to claim 2;
the drum mounted on an output shaft of the motor with the speed reduction mechanism; and
an opening cable and a closing cable, one end of each of which is connected to either a vehicle body or a sliding door,
wherein the motor with the speed reduction mechanism automatically opens and closes the sliding door by operating the opening cable and the closing cable.

* * * * *